(12) United States Patent
Yu et al.

(10) Patent No.: US 8,944,845 B2
(45) Date of Patent: Feb. 3, 2015

(54) POWER PLUG, ELECTRICAL PLUG ASSEMBLY AND ELECTRICAL CHARGER ASSEMBLY

(71) Applicants: Fu Tai Hua Industry (Shenzhen) Co., Ltd., Shenzhen (CN); Hon Hai Precision Industry Co., Ltd., New Taipei (TW)

(72) Inventors: Wei-Wei Yu, Shenzhen (CH); Che-Yu Chou, New Taipei (TW); Qun Huang, Shenzhen (CN); Tai-Shan Zhu, Shenzhen (CN); Tao Jiang, Shenzhen (CN); Wen-Chih Lan, New Taipei (TW); Zhi-Jun Shi, Shenzhen (CN); Jun-Liang Zhang, Shenzhen (CN); Ji-Bing Guo, Shenzhen (CN); Hua-Yong Wang, Shenzhen (CN); Hai-Qian Ge, Shenzhen (CN); Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/713,061

(22) Filed: Dec. 13, 2012

(65) Prior Publication Data

US 2013/0157483 A1 Jun. 20, 2013

(30) Foreign Application Priority Data

Dec. 15, 2011 (CN) .......................... 2011 1 0420429

(51) Int. Cl.
*H01R 29/00* (2006.01)
*H01R 13/447* (2006.01)
*H01R 31/06* (2006.01)
*H02J 7/00* (2006.01)

(52) U.S. Cl.
CPC ............ *H01R 13/447* (2013.01); *H01R 31/065* (2013.01); *H02J 7/0042* (2013.01)
USPC .......................... 439/518; 439/171; 439/172

(58) Field of Classification Search
CPC ..... H01R 27/00; H01R 31/06; H01R 2103/00
USPC .................................. 439/518, 171, 172, 173
See application file for complete search history.

(56) References Cited

U.S. PATENT DOCUMENTS 6,942,508 B2 * 9/2005 Wong ............................ 439/171
7,168,969 B1 * 1/2007 Wang ............................ 439/173

(Continued)

*Primary Examiner* — Hae Moon Hyeon
(74) *Attorney, Agent, or Firm* — Novak Druce Connolly Bove + Quigg LLP

(57) ABSTRACT

An exemplary plug assembly includes an accepting assembly and a power plug which is detachably inserted into the accepting assembly. The power plug includes a base body and an inserting assembly. The base body includes at least two blades with a specification adapted to a socket providing external AC power. The base body includes two conductive pads electrically connected to the blades. The inserting assembly includes a plug cover and two conductive connecting blades fixed to an inserting portion of the plug cover, the plug cover being detachably mounted to the base body. The accepting assembly includes a charger cover and two conductive pins fixed to an accepting portion of the charger cover. Each conductive connecting blade comprises a first conductive contact portion electrically connected to the conductive pad and a second conductive contact portion electrically connected to the conductive pin.

18 Claims, 10 Drawing Sheets

(56) References Cited

U.S. PATENT DOCUMENTS

| | | | |
|---|---|---|---|
| 7,946,868 B1 * | 5/2011 | Chen | 439/173 |
| 8,210,858 B2 * | 7/2012 | Lee et al. | 439/108 |
| 8,226,424 B1 * | 7/2012 | Wang et al. | 439/172 |
| 8,414,318 B1 * | 4/2013 | Chen | 439/173 |
| 8,579,656 B2 * | 11/2013 | Huang | 439/518 |
| 2011/0009003 A1 * | 1/2011 | Youssefi-Shams et al. | 439/628 |
| 2011/0009005 A1 * | 1/2011 | Youssefi-Shams et al. | 439/628 |
| 2011/0143560 A1 * | 6/2011 | Lee et al. | 439/108 |
| 2013/0288493 A1 * | 10/2013 | Shi et al. | 439/131 |
| 2014/0073200 A1 * | 3/2014 | Chou et al. | 439/692 |

\* cited by examiner

POWER PLUG, ELECTRICAL PLUG ASSEMBLY AND ELECTRICAL CHARGER ASSEMBLY

BACKGROUND

1. Technical Field

The present disclosure generally relates to plug assemblies used to connect a mains electricity supply with an electronic device requiring such power, and to an electrical charger assembly with a power plug adapted to connect to a socket of the mains electricity supply.

2. Description of Related Art

Portable electronic devices, such as mobile phones and personal digital assistants (PDAs), are used all over the world. These portable electronic devices have individual rechargeable batteries as energy storage elements for providing operation voltages. When going out or traveling, people need to ensure that the battery of their portable electronic device has sufficient charge. Thus a charger is needed to recharge the battery.

Most chargers include a charger housing and a power plug connected to the charger housing via a cable. There are many types of power plugs in different countries, or even in one country, each type of power plug having a detailed specification and being suitable only for a certain type of mains power socket. In some circumstances the available power socket may not match the power plug. For example, the power plug may be a two-pin blade plug, and the power socket may be a three-pin socket with cylindrical receptacles.

What is needed, therefore, is a means of overcoming the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will be made to the drawings to describe various embodiments.

Figure 1:
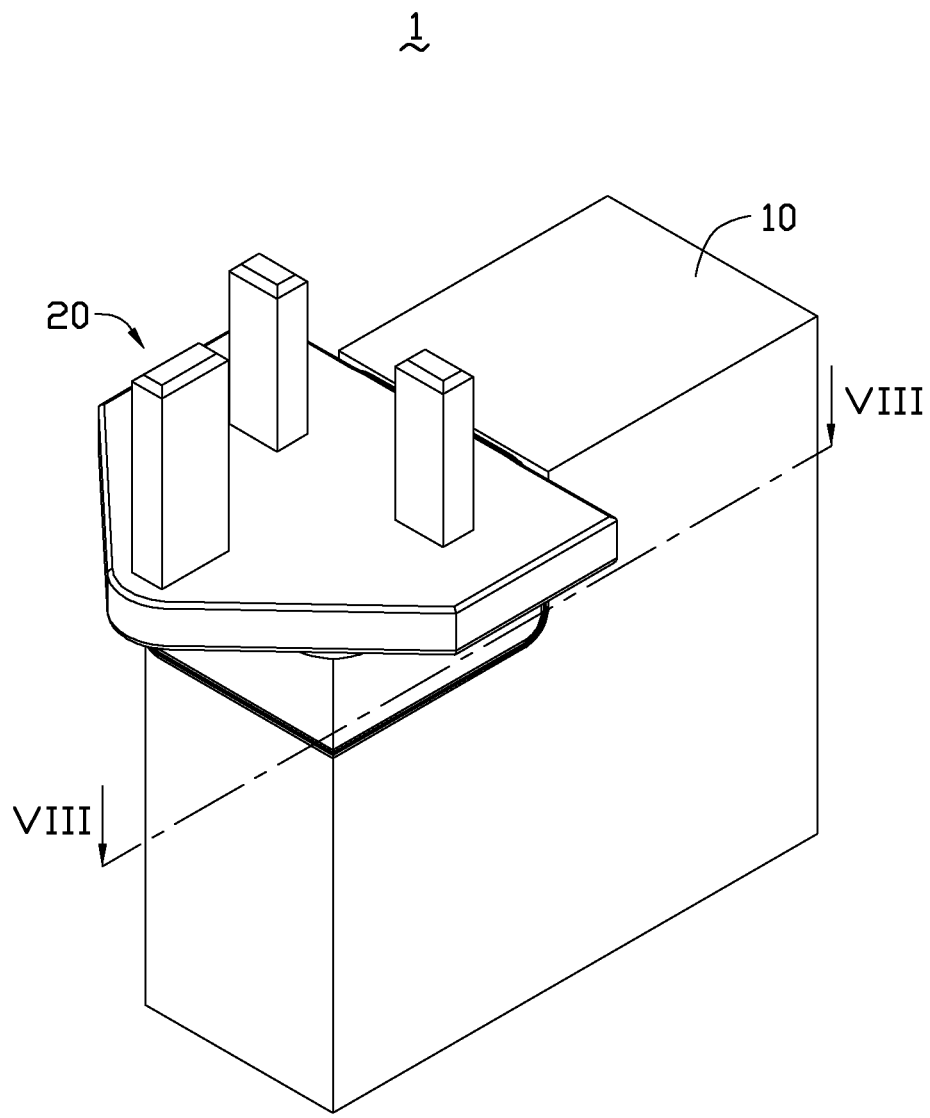
FIG. 1 is an isometric view of a charger assembly according to a first embodiment of the present disclosure, wherein the charger assembly includes a power plug and a charger.
Figure 2:
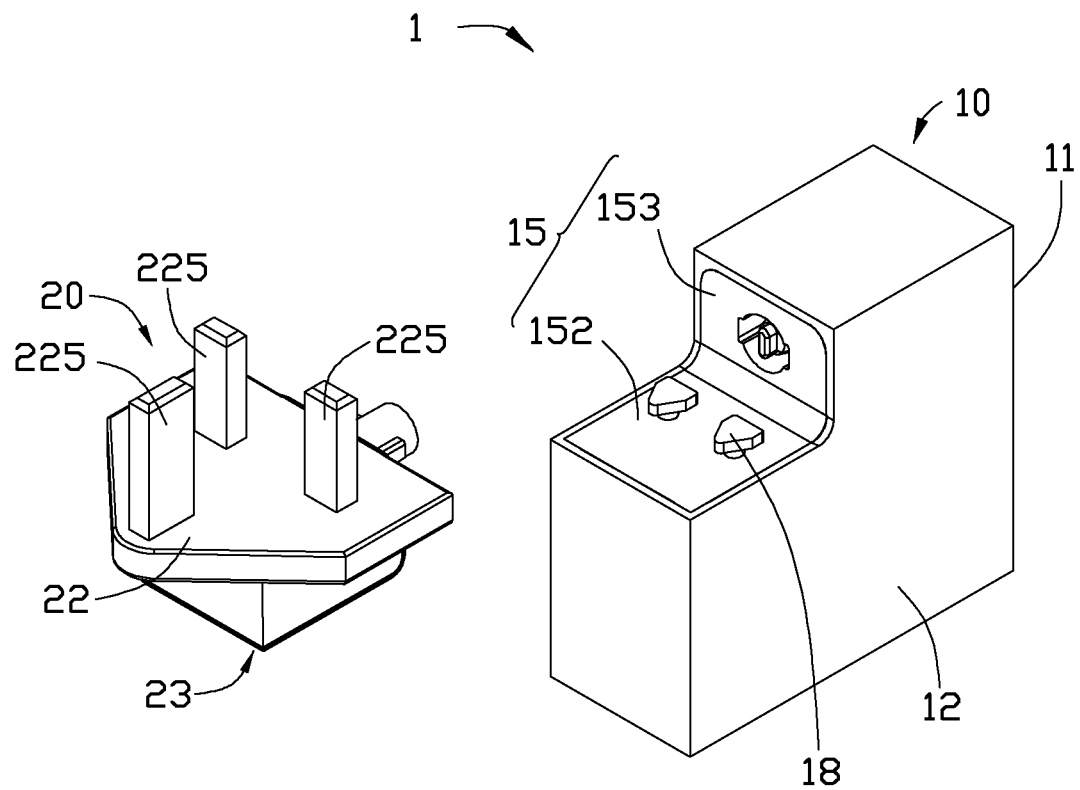
FIG. 2 is an exploded view of the charger assembly of FIG. 1.
Figure 6:
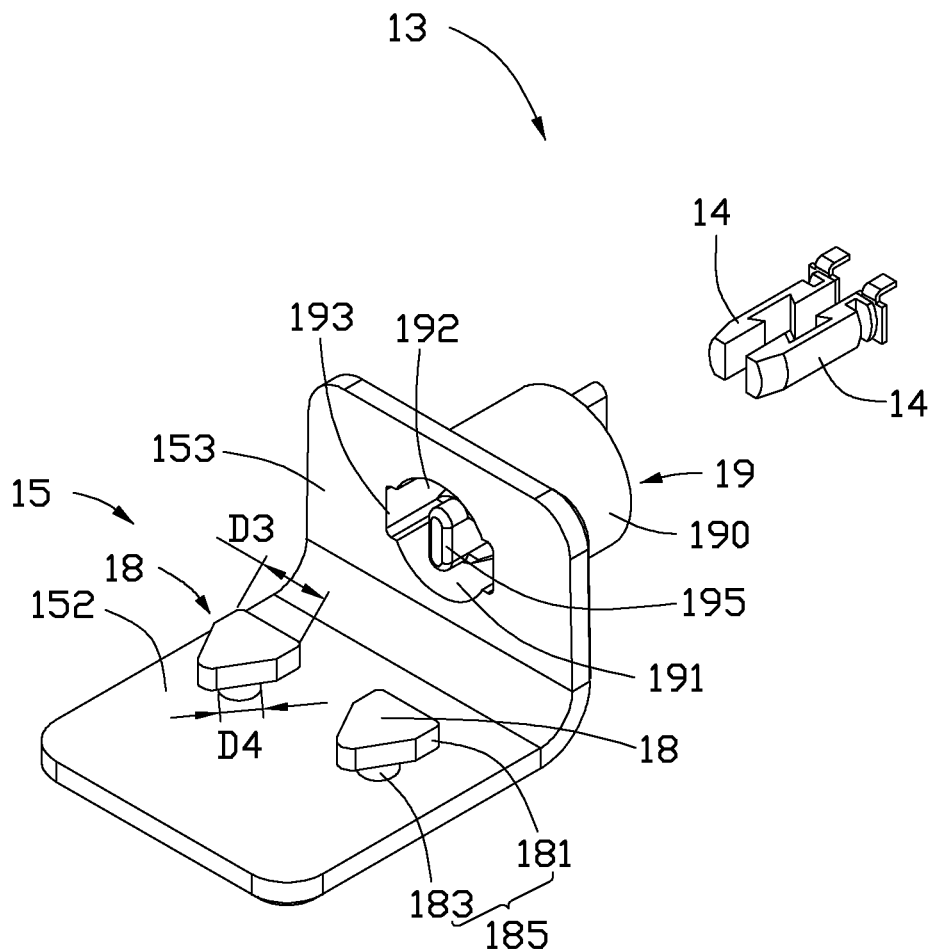
FIG. 6 is an enlarged, exploded, isometric view of an accepting assembly of the charger of FIG. 2.

Referring to FIGS. 1 and 2, in a first embodiment, a charger assembly 1 includes a charger 10 and a power plug 20. Referring also to FIG. 6, the charger 10 includes a charger body 11 and an accepting assembly 13.

Figure 3:
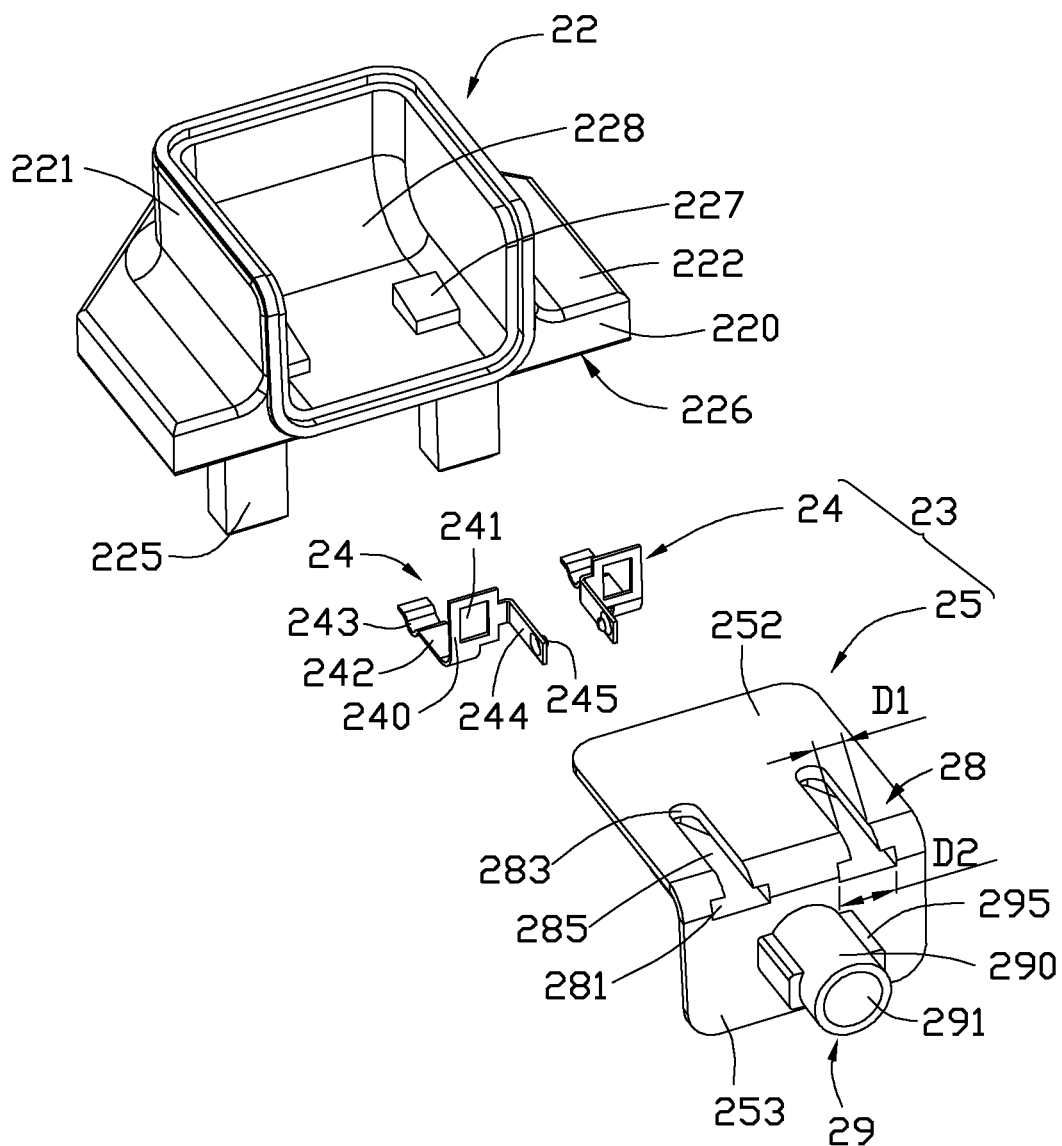
FIG. 3 is an exploded, isometric view of the power plug of the charger assembly of FIG. 2, showing the power plug upside down, and wherein the power plug includes a base body and an inserting assembly.

Referring also to FIG. 3, the power plug 20 may be a three-pin plug or a two-pin plug. In this embodiment, the power plug 20 is the three-pin plug. The power plug 20 includes a base body 22 and an inserting assembly 23. The base body 22 includes a base plate 220 having a first surface 222 and a second surface 226 at opposite sides thereof. Three first sidewalls 221 perpendicularly extend from the first surface 222 of the base plate 220, and three plug pins 225 perpendicularly extend from the second surface 226 of the base plate 220. The three plug pins 225 electrically connect to a socket providing, e.g., domestic alternating current (AC) of 220-240 volts or the like. One of the three plug pins 225 connects to ground, and the other two plug pins 225 connect to the operation voltage of the socket. The three first sidewalls 221 connect end to end to form a first space 228, with a bottom side and a front side of the first space 228 exposed to the outside. Two conductive pads 227 are disposed on the first surface 222 of the base plate 220 inside the first space 228, and electrically connect to said other two plug pins 225.

The inserting assembly 23 includes two conductive connecting blades 24 and a plug cover 25. The conductive connecting blades 24 are mirror images of each other. Each conductive connecting blade 24 includes a flat piece 240 which defines a first fixing hole 241, a first extending piece 242, and a second extending piece 244. The flat piece 242 is rectangular. The first and second extending pieces 242, 244 perpendicularly extend from two adjacent sides of the flat piece 240. The first and second extending pieces 242, 244 extend away from each other in substantially opposite directions. A first conductive contact portion 243 protrudes from a distal end of the first extending piece 242. A second conductive contact portion 245 protrudes from an inner face of a distal end of the second extending piece 244, whereby a surface of the second conductive contact portion 245 is hidden from the flat piece 240.

Figure 4:
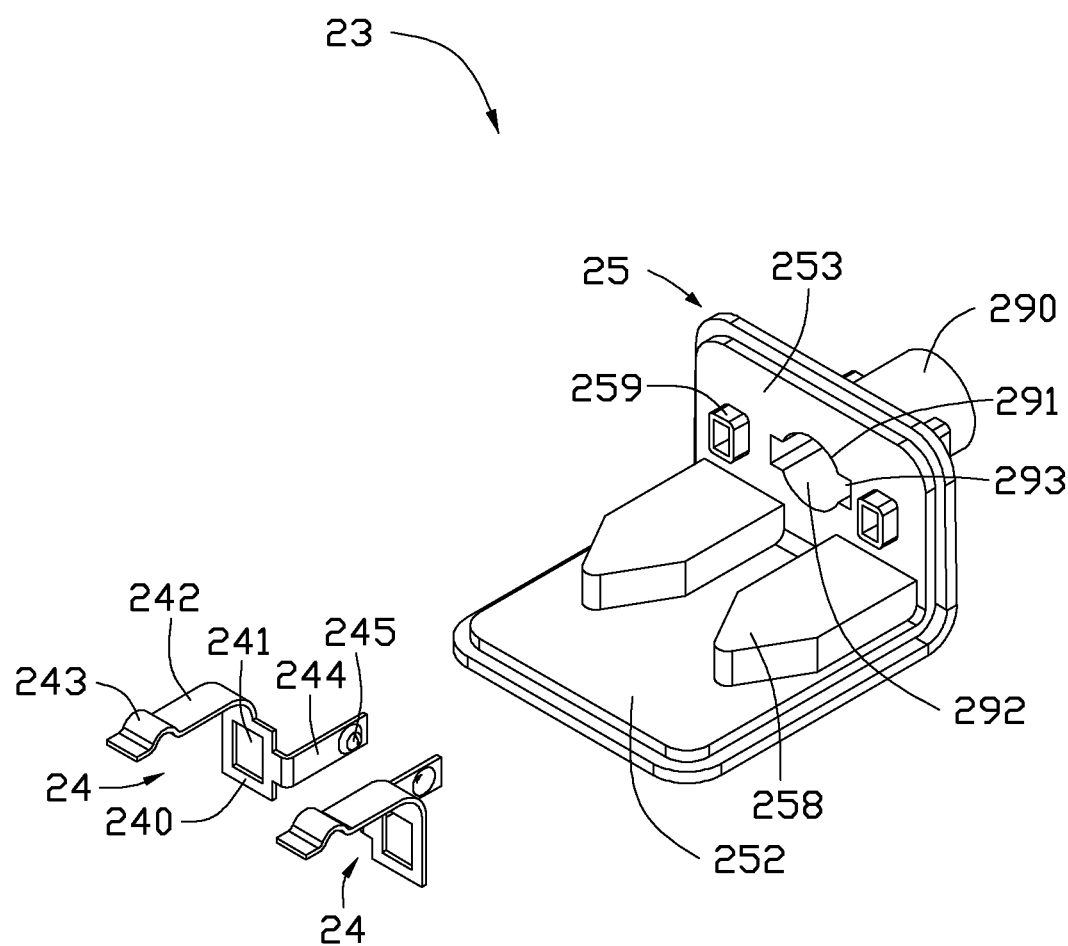
FIG. 4 is an exploded, isometric view of the inserting assembly of the power plug of FIG. 3.

Referring also to FIG. 4, the plug cover 25 includes a lower plate 252, a first end plate 253 perpendicularly connected to the lower plate 252, and an inserting portion 29. The lower plate 252 and the first end plate 253 form an L-shaped profile. Two holding portions 258 protrude from a front surface of the lower plate 252. Two receiver slots 285 are defined in the two holding portions 258, respectively, and the receiver slots 285 are essentially blind slots. Each receiver slot 285 resembles the letter "T" as viewed in FIG. 3; and includes a narrow portion 283 (representing the stem part of the "T") at a bottom surface of the lower plate 252, and a wide portion 281 (representing the crossbar part of the "T") in a curved fillet where the first end plate 253 connects to the lower plate 252. A width D1 of the narrow portion 283 is less than a width D2 of the wide portion 281, therefore forming the "T" shaped profile. The pair of receiver slots 285 serve as a first fixing unit 28 of the inserting assembly 23.

The first end plate 253 includes two fixing portions 259 protruding from the front surface thereof. The two fixing portions 259 are located above the two holding portions 258. The inserting portion 29 extends out from the rear surface of the first end plate 253. The inserting portion 29 is cylindrical and hollow, and defines a central inserting hole 292. The inserting hole 292 passes through both the entire first end plate 253 and the entire inserting portion 29. A front end of the inserting hole 292 is located between the two fixing portions 259. The inserting portion 29 includes a first cylindrical outer surface 290 and a first cylindrical inner surface 291. The first cylindrical inner surface 291 defines two parallel first containing grooves 293 at opposite lateral sides thereof, respectively. The two first containing grooves 293 communicate with the inserting hole 292, and also extend through the entire first end plate 253. The first cylindrical outer surface 290 includes two parallel sliding blocks 295 at opposite lateral sides thereof, respectively.

Figure 5:
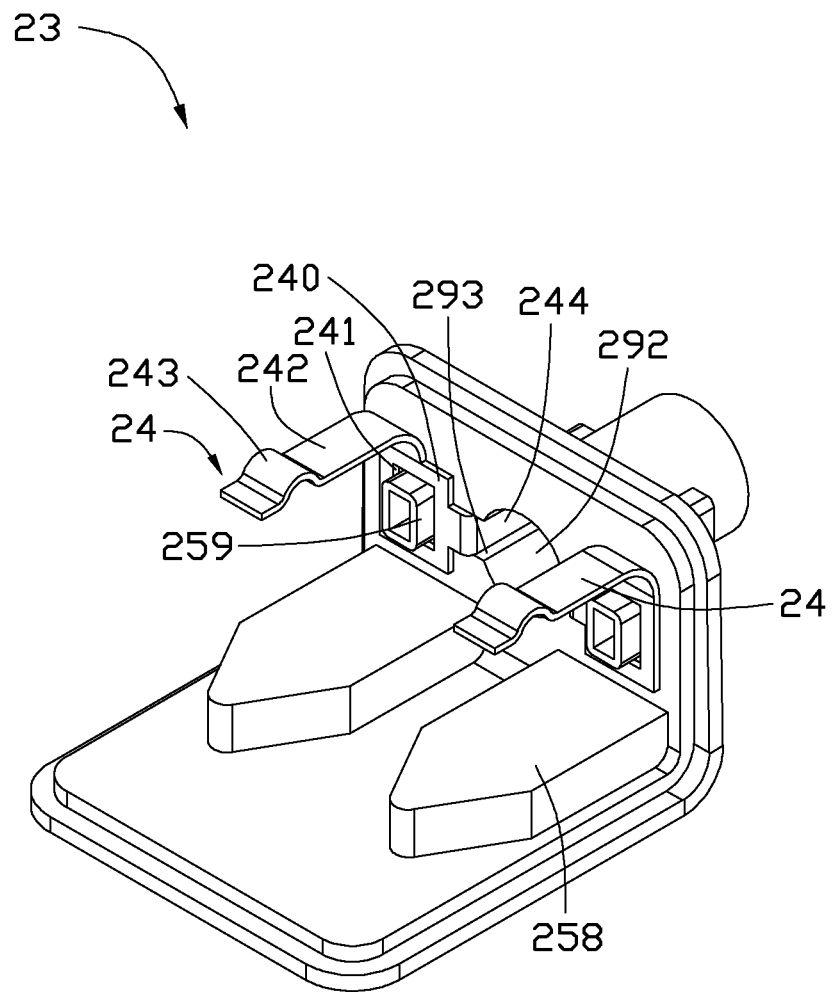
FIG. 5 is an assembled view of the inserting assembly of FIG. 4.

Referring also to FIG. 5, the two conductive connecting blades 24 are fixed to the plug cover 25. The two fixing portions 259 are inserted into the first fixing holes 241 of the flat pieces 240 of the two conductive connecting blades 24, thereby fixing the conductive connecting blades 24 to the first end plate 253 of the plug cover 25. For each conductive connecting blade 24, the first extending piece 242 and one of the two holding portions 258 immediately below oppose each other; and the first extending piece 242 and the corresponding holding portion 258 are located generally at opposite sides of a corresponding one of the first fixing holes 241. The second extending pieces 244 of the two conductive connecting blades 24 are received in the two first containing grooves 293 and limited in the first containing grooves 293. The inserting assembly 23 is detachably engaged with the base body 22, e.g., by snap-fitting of a peripheral edge (not labeled) of the plug cover 25 into a peripheral groove (not labeled) defined in a peripheral edge (not labeled) of the base body 22. The lower plate 252 and the first end plate 253 of the plug cover 25 cooperatively cover a bottom end and a rear end of the first space 228. Thereby, the first space 228 is cooperatively enclosed by the base body 22 and the plug cover 25, and the conductive connecting blades 24, the holding portions 258 and the conductive pads 227 are enclosed in the first space 228. The first conductive contact portions 243 of the two conductive connecting blades 24 resiliently abut against the two conductive pads 227 of the base body 22, and operation voltages can be applied to the conductive connecting blades 24 by the cooperation of the plug pins 225, the conductive pads 227 and the first conductive contact portions 243.

The charger body 11 of the charger 10 includes a charger housing 12. The charger housing 12 is hollow and defines a cutout at a top front corner thereof. The inserting assembly 23 is detachably mounted in the cutout. The accepting assembly 13 of the charger 10 includes two conductive pins 14 and a charger cover 15. The charger cover 15 covers the charger housing 12 and detachably engages with the plug cover 25 of the inserting assembly 23.

Figure 7:
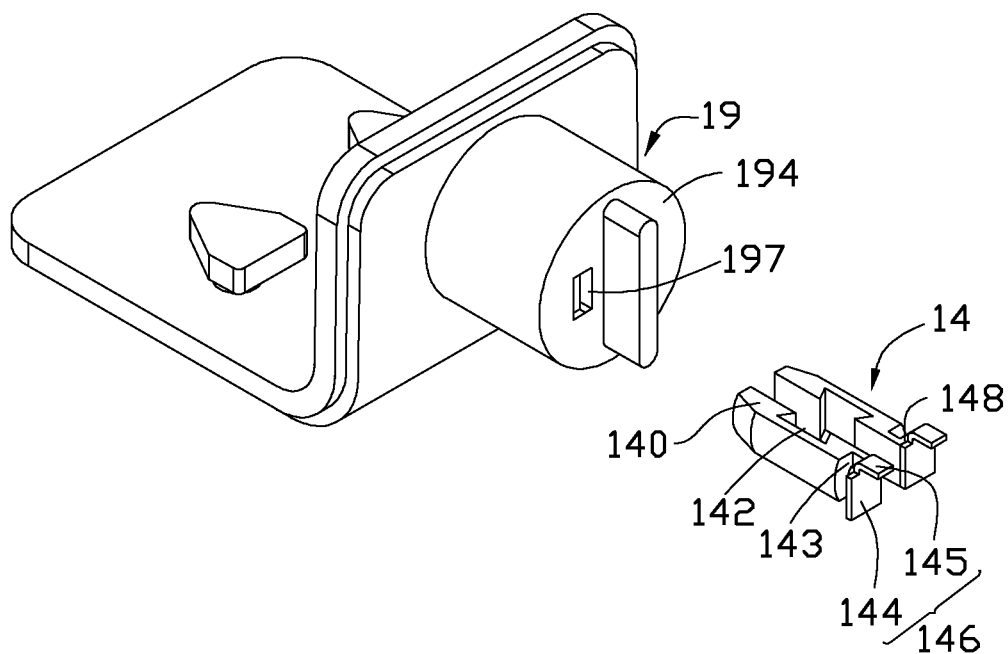
FIG. 7 is similar to FIG. 6, but viewed from another aspect.

Referring to FIGS. 6 and 7, the conductive pins 14 are symmetrical about an imaginary center line of the charger cover 15. Each conductive pin 14 includes a main body 140, and a leading-out portion 146 attached to a first end 148 of the main body 140. The main body 140 defines a first buckling groove 143 and a second buckling groove 142 at opposite outer and inner sides thereof, respectively. The first buckling groove 143 is closer to the first end 148 of the main body 140 than the second buckling groove 142. The leading-out portion 146 includes a flat blade 144 attached to an end surface of the first end 148 of the main body 140, and an extending blade 145 perpendicularly connected to the flat blade 144.

The charger cover 15 includes a bottom plate 152, a second end plate 153 perpendicularly connected to the bottom plate 152, and an accepting portion 19. The bottom plate 152 and the second end plate 153 form an L-shaped profile. The bottom plate 152 includes two fixing protrusions 185 protruding from a top side thereof. Each fixing protrusion 185 includes a first portion 183 and a second portion 181, wherein the first portion 183 interconnects the second portion 181 and the bottom plate 152. In the illustrated embodiment, the first portion 183 is in the form of a neck, and the second portion 181 is in the form of a head. The first portion 183 perpendicularly protrudes from the bottom plate 152. The first portion 183 is cylindrical, and has a diameter D4 substantially the same as the width D1 of the narrow portion 283. The second portion 181 is approximately triangular, and has a width D3 substantially the same as the width D2 of the wide portion 281. The pair of fixing protrusions 185 serve as a second fixing unit 18 of the accepting assembly 13.

The accepting portion 19 extends rearward out from the second end plate 153 at a side of the second end plate 153 opposite from the side where the bottom plate 152 is connected. The accepting portion 19 is cylindrical and hollow, and defines a central accepting hole 192. The accepting hole 192 extends from the second end plate 153 to a tail 194 of the accepting portion 19. The accepting portion 19 includes a second cylindrical outer surface 190 and a second cylindrical inner surface 191. The second cylindrical inner surface 191 defines two second containing grooves 193 at opposite lateral sides thereof, respectively. The second containing grooves 193 communicate with the accepting hole 192. A fixing pin 195 is disposed in the center of the accepting hole 192, protruding into the accepting hole 192 from the center of the tail 194 of the accepting portion 19. The fixing pin 195 includes two fixing blocks 196 extending from opposite lateral sides thereof, respectively. Thus the two fixing blocks 196 face the two second containing grooves 193. The tail 194 of the accepting portion 19 defines two stepped holes 197 (only one visible in FIG. 7) at opposite lateral sides of the fixing pin 195, respectively, thereby forming a pair of opposite protruding ribs 198 of the tail 194.

Figure 8:
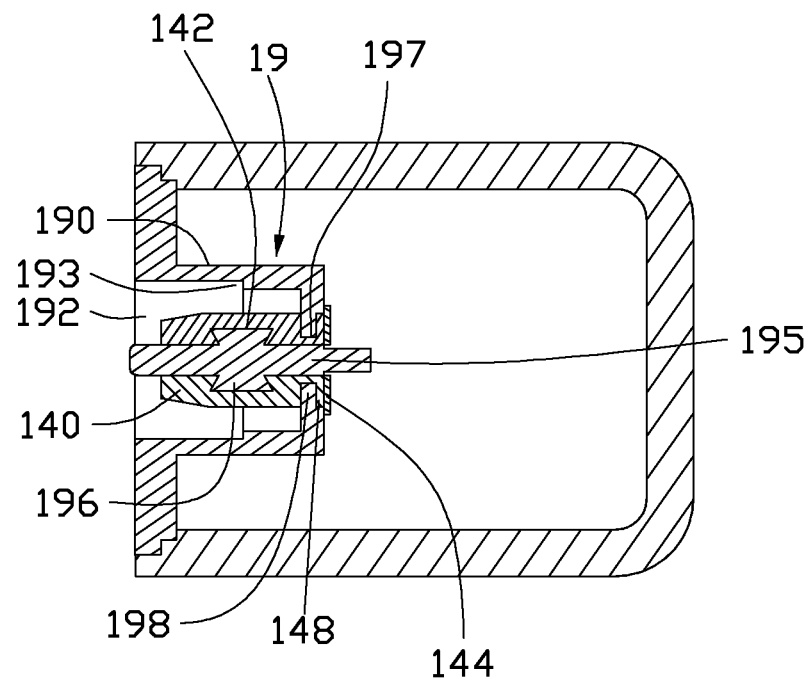
FIG. 8 is a cross-sectional view of only the charger of FIG. 1, taken along line VIII-VIII thereof.

Referring also to FIG. 8, the two conductive pins 14 are integrally joined with the charger cover 15. The conductive pins 14 and the charger cover 15 can be integrally formed together by a process of insert molding. The two conductive pins 14 are closely joined to the fixing pin 195 at opposite sides of the fixing pin 195, respectively. The fixing blocks 196 of the fixing pin 195 are received in the second buckling grooves 142 of the two conductive pins 14, and the two protruding ribs 198 of the tail 194 are received in the first buckling grooves 143. The leading-out portions 146 are limited outside of the accepting portion 19 by the first ends 148 of the two conductive pins 14 being engaged in the stepped holes 197 of tail 194. Thereby, the leading-out portions 146 are enclosed in the charger housing 12 for electrical connection to inner circuit elements of the charger 10.

Figure 9:
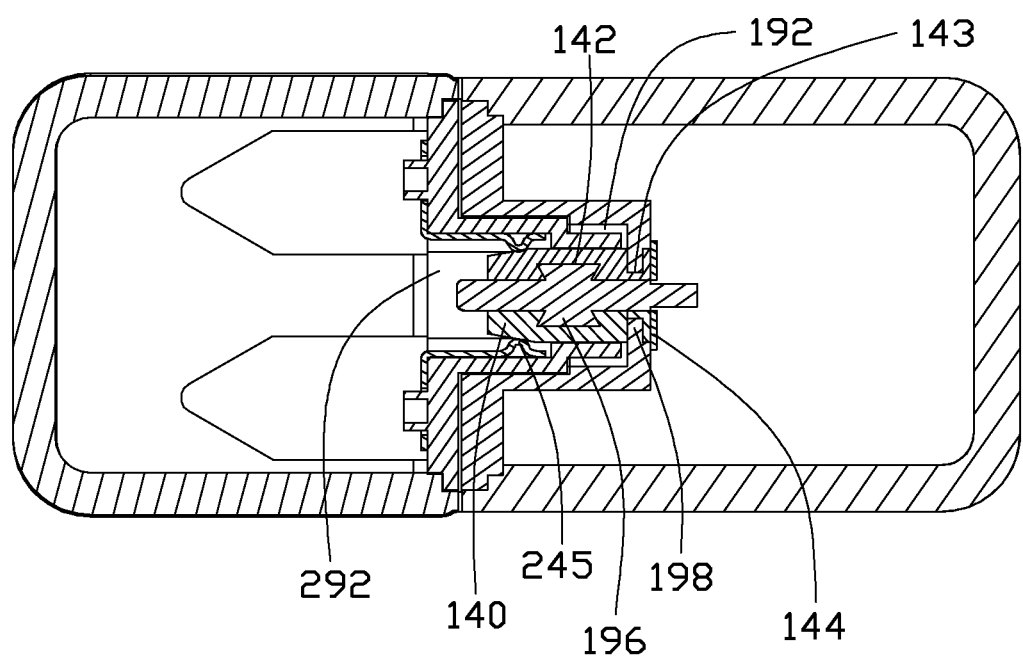
FIG. 9 is a cross-sectional view of both the power plug and the charger of FIG. 1, taken along line VIII-VIII thereof.

Referring also to FIG. 9, in use of the charger assembly 1, the power plug 20 is adapted for connection to a socket of an external AC power source, and the inserting portion 29 of the inserting assembly 23 of the power plug 20 is inserted into the accepting portion 19 of the accepting assembly 13, thereby allowing the operation voltage of the AC power source to be applied to the charger 10.

When a user inserts the inserting portion 29 into the accepting portion 19, the lower plate 252 is positioned on the bottom plate 152, the fixing protrusions 185 slide into the receiver slots 285 until the first end plate 253 abuts against the second end plate 153, the first portions 183 of the fixing protrusions 185 are engaged in the narrow portions 283 of the receiver slots 285, and the second portions 181 of the fixing protrusions 185 are engaged in the wide portions 281 of the receiver slots 285. The second extending pieces 244 and the inserting portion 29 are received and held in the accepting hole 192 of the accepting portion 19, and the fixing pin 195 and the two conductive pins 14 are received and held in the inserting hole 292 of the inserting portion 29. Thus, the second conductive contact portions 245 abut and contact the main bodies 140 of the conductive pins 14. Thereby, the operation voltage can be applied to the charger 10, and the charger 10 can function to recharge batteries.

With the above-described configuration, the power plug 20 is not connected to the charger 10 via a cable. Rather, the power plug 20 can be directly inserted into the charger 10, and can be separated from the charger 10 by drawing the power plug 20 out from the charger 10. Thereby, the one charger 10 is universally adaptable to a plurality of different power plugs 20 with different specifications. That is, only the power plug 20 needs to be switched in the case where another different AC power socket with a different specification needs to be utilized. Furthermore, the plug cover 25 of the inserting assembly 23 is detachably mounted to the base body 22 having the three plug pins 225. Therefore when another power plug 20 is needed, only the base body 22 needs to be replaced, by another base body 22 with plug pins having a specification different from that of the plug pins 225. In this way, the specification of the power plug 20 can be adapted to different AC power sockets having different specifications. The conductive pads 227 and the corresponding first conductive contact portions 243 of the conductive connecting blades 24 abut against each other resiliently. Therefore when another base body 22 is used to replace an original base body 22 of the power plug 20, there is no need to use or replace cables or other connections. The user can adapt the charger assembly 1 to different AC power sockets more conveniently.

Figure 10:
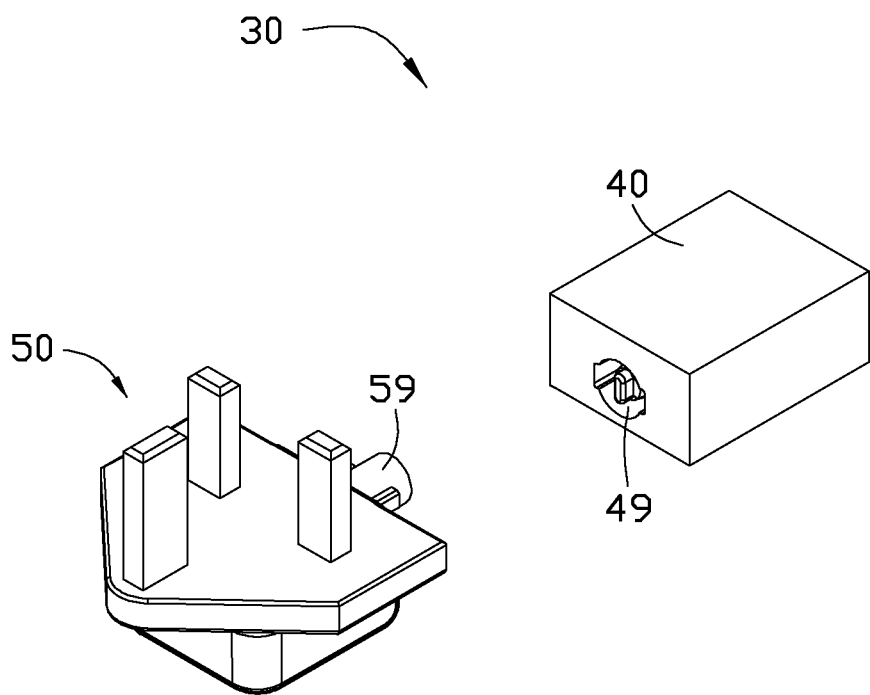
FIG. 10 is an isometric view of a charger assembly according to a second embodiment of the present disclosure.

Referring to FIG. 10, a chamber assembly 30 according to a second embodiment of the present disclosure is similar to the chamber assembly 10 of the first embodiment. However, in the chamber assembly 30, a charger 40 is substantially a rectangular parallelepiped, and does not define a cutout. A charger cover (not labeled) of the charger 40 includes a plate substantially the equivalent of only the second end plate 153. To use the charger assembly 30, a user merely inserts an inserting portion 59 into an accepting portion 49, whereby a power plug 50 is engaged with the charger 40. There is no need to provide a first fixing unit on a cover of the power plug 50, and there is no need to provide a second fixing unit on a cover of the charger.

Furthermore, taking the above-described first embodiment as an example, the power plug 20 and the accepting assembly 13 can serve as a plug assembly to apply an operation voltage of an AC power socket to other kinds of electrical devices besides the charger 10. The power plug 20 is adapted for connection an AC power socket. In the above-described embodiment, the inserting portion 25 of the inserting assembly 23 of the power plug 20 is insertable into the accepting portion 19 of the accepting assembly 13 of the charger 10; and likewise the inserting portion 25 of the inserting assembly 23 of the power plug 20 is insertable into the accepting portion 19 of the accepting assembly 13 of any other electrical device having such accepting portion 19 and accepting assembly 13. Thereby, the operation voltage of the AC power socket can be applied to a variety of electrical devices by the one same power plug 20.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A plug assembly, comprising:
 a power plug comprising:
  a base body comprising at least two plug pins configured to connect with a socket of an external power source, the base body defining an internal space at a side of the base body opposite from the side where the plug pins are located, two conductive pads mounted in the space and electrically connected to two of the at least two plug pins; and
 an inserting assembly comprising a plug cover and two conductive connecting blades fixed to an inserting portion of the plug cover, the plug cover detachably mounted to the base body to enclose the space, each conductive connecting blade comprising a first conductive contact portion and a second conductive contact portion, the first conductive contact portions of the two conductive connecting blades electrically connected to the two conductive pads, respectively; and
 an accepting assembly comprising a charger cover and two conductive pins structured and arranged to be electrically connected to circuit elements of a desired electrical device, the conductive pins being fixed to an accepting portion of the charger cover, the inserting portion configured to be inserted into and detachably engaged with the accepting portion to make the second conductive contact portions electrically connect with the conductive pins;
 wherein the base body further comprises a base plate having a first surface and a second surface at opposite sides thereof, the three sidewalls perpendicular extend from the first surface of the base plate, the three sidewalls connect end to end to form the space with the space having a top end and a front end of the space covered by the plug cover, and the at least two plug pins substantially perpendicularly extend from the second surface of the base plate.

2. The plug assembly of claim 1, wherein the at least two plug pins are selected from the group consisting of two plug pins and three plug pins.

3. The plug assembly of claim 1, wherein the plug cover comprises a lower plate and a first end plate perpendicularly connected to the lower plate, the lower plate and the first end plate cover the top end and the front end of the space to enclose the space, the first end plate comprises two fixing portions protruding from a front surface of the first end plate facing the space, the inserting portion extends out from an rear surface of the first end plate, the inserting portion is cylindrical and hollow, and defines a central inserting hole passing through both the entire first end plate and the entire inserting portion, the inserting portion comprises a first cylindrical outer surface and a first cylindrical inner surface, the first cylindrical inner surface defines two first containing grooves at opposite sides of the first cylindrical inner surface, and the two first containing grooves communicate with the inserting hole.

4. The plug assembly of claim 3, wherein each conductive connecting blade comprises a flat piece, a first extending piece, and a second extending piece, the flat piece is rectangular and defines a first fixing hole, the first and second extending pieces perpendicularly extend from two adjacent sides of the flat piece, the first and second extending pieces extend away from each other in substantially opposite directions, the first conductive contact portion protrudes from a distal end of the first extending piece, the second conductive contact portion protrudes from an inner face of a distal end of the second extending piece whereby a surface of the second conductive contact portion is hidden from the flat piece, the fixing portions are inserted into the first fixing holes of the flat pieces of the conductive connecting blades thereby fixing the conductive connecting blades to the first end plate, the first extending pieces of the conductive connecting blades are received in the space with the first conductive contact portions resiliently abutting against the conductive pads, and the second extending pieces are received and limited in the first containing grooves.

5. The plug assembly of claim 4, wherein the charger cover comprises a second end plate having a side facing the first end plate, the accepting portion extends out from an opposite side of the second end plate in a direction away from the first end plate, the accepting portion is cylindrical and hollow and defines a central accepting hole, the accepting hole extends from the second end plate to a tail of the accepting portion, the accepting portion comprises a second cylindrical outer surface and a second cylindrical inner surface, a fixing pin is disposed in the center of the accepting hole, protruding into the accepting hole from the center of the tail of the accepting portion, each conductive pin comprises a main body and a leading-out portion attached to a first end of the main body, the leading-out portions of the two conductive pins are located outside the accepting portion at the tail of the accepting portion and thus positioned to electrically connect to the circuit elements of the electrical device, and the conductive pins are joined to the fixing pin at opposite sides of the fixing pin; and when the inserting assembly is inserted into the accepting assembly, the inserting portion and the second extending pieces are received and limited in the accepting hole, the fixing pin and the two conductive pins are received and limited in the inserting hole of the inserting portion, and the second conductive contact portions resiliently abut against the main bodies of the conductive pins.

6. The plug assembly of claim 5, wherein the first cylindrical outer surface comprises two sliding blocks at opposite sides thereof, the second cylindrical inner surface defines two second containing grooves at opposite sides thereof, the second containing grooves communicate with the accepting hole, and the sliding blocks are received and limited in the second containing grooves when the inserting assembly is inserted into the accepting assembly.

7. The plug assembly of claim 5, wherein the charger cover further comprises a bottom plate perpendicularly connected to the second end plate, the lower plate of the plug cover comprises a first fixing unit facing the bottom plate of the charger cover, and the bottom plate comprises a second fixing unit facing the lower plate of the plug cover; and when the inserting portion is inserted into the accepting portion, the first and second fixing units cooperate with each other to detachably fix the inserting assembly and the accepting assembly together.

8. The plug assembly of claim 7, wherein the first fixing unit comprises two receiver slots, and the second fixing unit comprises two fixing protrusions.

9. The plug assembly of claim 5, wherein the fixing pin comprises two fixing blocks extending from opposite sides thereof, the tail of the accepting portion defines two stepped holes at opposite sides of the fixing pin, respectively, thereby forming a pair of opposite protruding ribs of the tail, the main body of each conductive pin defines a first buckling groove and a second buckling groove at opposite sides thereof, the first buckling groove is closer to the first end of the main body than the second buckling groove, the fixing blocks are fixed in the second buckling grooves of the two conductive pins, and the protruding ribs are fixed in the first buckling grooves of the two conductive pins.

10. A charger assembly, comprising:
a power plug comprising:
a base body comprising at least two plug pins configured to connect with a socket of an external power source, the base body defining a space at a side of the base body opposite from the side where the plug pins are located, two conductive pads mounted in the space and electrically connected to two of the at least two plug pins; and
an inserting assembly comprising a plug cover and two conductive connecting blades fixed to an inserting portion of the plug cover, the plug cover detachably mounted to the base body to enclose the space, each conductive connecting blade comprising a first conductive contact portion and a second conductive contact portion, the first conductive contact portions of the two conductive connecting blades electrically connected to the two conductive pads, respectively; and
a charger comprising a charger body and an accepting assembly, the accepting assembly comprising a charger cover and two conductive pins electrically connected to inner circuit elements of the charger body, the conductive pins being fixed to an accepting portion of the charger cover, the inserting portion configured to be inserted into and detachably engaged with the accepting portion to make the second conductive contact portions electrically connect with the conductive pins;
wherein the base body further comprises a base plate having a first surface and a second surface at opposite sides thereof, the three sidewalls perpendicular extend from the first surface of the base plate, the three sidewalls connect end to end to form the space with the space having a top end and a front end of the space covered by the plug cover, and the at least two plug pins substantially perpendicularly extend from the second surface of the base plate.

11. The charger assembly of claim 10, wherein the at least two plug pins are selected from the group consisting of two plug pins and three plug pins.

12. The charger assembly of claim 10, wherein the plug cover comprises a lower plate and a first end plate perpendicularly connected to the lower plate, the lower plate and the first end plate cover the top end and the front end of the space to enclose the space, the first end plate comprises two fixing portions protruding from a front surface of the first end plate facing the space, the inserting portion extends out from an rear surface of the first end plate, the inserting portion is cylindrical and hollow, and defines an inserting hole passing through both the entire first end plate and the entire inserting portion, the inserting portion comprises a first cylindrical outer surface and a first cylindrical inner surface, the first cylindrical inner surface defines two first containing grooves at opposite sides of the first cylindrical inner surface, and the two first containing grooves communicate with the inserting hole.

13. The charger assembly of claim 12, wherein each conductive connecting blade comprises a flat piece, a first extending piece, and a second extending piece, the flat piece is rectangular and defines a first fixing hole, the first and second extending pieces perpendicularly extend from two adjacent sides of the flat piece, the first and second extending pieces extend away from each other in substantially opposite directions, the first conductive contact portion protrudes from a distal end of the first extending piece, the second conductive contact portion protrudes from an inner face of a distal end of the second extending piece whereby a surface of the second conductive contact portion is hidden from the flat piece, the fixing portions are inserted into the first fixing holes of the flat pieces of the conductive connecting blades thereby fixing the conductive connecting blades to the first end plate, the first extending pieces of the conductive connecting blades are received in the space with the first conductive contact portions resiliently abutting against the conductive pads, and the second extending pieces are received and limited in the first containing grooves.

14. The charger assembly of claim 13, wherein the charger cover comprises a second end plate having a side facing the first end plate, the accepting portion extends out from an opposite side of the second end plate in a direction away from the first end plate, the accepting portion is cylindrical and hollow and defines a central accepting hole, the accepting hole extends from the second end plate to a tail of the accepting portion, the accepting portion comprises a second cylindrical outer surface and a second cylindrical inner surface, a fixing pin is disposed in the center of the accepting hole, protruding into the accepting hole from the center of the tail of the accepting portion, each conductive pin comprises a main body and a leading-out portion attached to a first end of the main body, the leading-out portions of the two conductive pins are located outside the accepting portion at the tail of the accepting portion and thus positioned to electrically connect to the circuit elements of the charger, the conductive pins are joined to the fixing pin at opposite sides of the fixing pin; and when the inserting assembly is inserted into the accepting assembly, the inserting portion and the second extending pieces are received and limited in the accepting hole, the fixing pin and the two conductive pins are received and limited in the inserting hole of the inserting portion, and the second conductive contact portions resiliently abut against the main bodies of the conductive pins.

15. The charger assembly of claim 14, wherein the first cylindrical outer surface comprises two sliding blocks at opposite sides thereof, the second cylindrical inner surface defines two second containing grooves at opposite sides thereof, the second containing grooves communicate with the accepting hole, and the sliding blocks are received and limited in the second containing grooves when the inserting assembly is inserted into the accepting assembly.

16. The charger assembly of claim 14, wherein the charger body defines an opening, the charger cover encloses the opening of the charger body, the charger cover further comprises a bottom plate perpendicularly connected to the second end plate, the lower plate of the plug cover comprises a first fixing unit facing the bottom plate of the charger cover, and the bottom plate comprises a second fixing unit facing the lower plate of the plug cover; and when the inserting portion is inserted into the accepting portion, the first and second fixing units cooperate with each other to detachably fix the inserting assembly and the accepting assembly together, the first fixing unit comprises two receiver slots, and the second fixing unit comprises two fixing protrusions.

17. The charger assembly of claim 14, wherein the fixing pin comprises two fixing blocks extending from opposite sides thereof, the tail of the accepting portion defines two stepped holes at opposite sides of the fixing pin, respectively, thereby forming a pair of opposite protruding ribs of the tail, the main body of each conductive pin defines a first buckling groove and a second buckling groove at opposite sides thereof, the first buckling groove is closer to the first end of the main body than the second buckling groove, the fixing blocks are fixed in the second buckling grooves of the two conductive pins, and the protruding ribs are fixed in the first buckling grooves of the two conductive pins.

18. A power plug comprising:
a base body comprising at least two plug pins configured to connect with a socket of an external power source, the base body defining an internal space at a side of the base body opposite from the side where the plug pins are located, two conductive pads mounted in the space and electrically connected to two of the at least two plug pins; and
an inserting assembly comprising a plug cover and two conductive connecting blades fixed to an inserting portion of the plug cover, the plug cover detachably mounted to the base body to enclose the space, each conductive connecting blade comprising a first conductive contact portion and a second conductive contact portion, the first conductive contact portions of the two conductive connecting blades electrically connected to the two conductive pads, respectively, and the second conductive contact portions of the two conductive connecting blades structured and arranged to mechanically and electrically connect to conductive pins of an electrical device mateable with the power plug;
wherein the base body further comprises a base plate having a first surface and a second surface at opposite sides thereof, the three sidewalls perpendicular extend from the first surface of the base plate, the three sidewalls connect end to end to form the space with the space having a top end and a front end of the space covered by the plug cover, and the at least two plug pins substantially perpendicularly extend from the second surface of the base plate.

* * * * *